United States Patent [19]

Beausoleil et al.

[11] 3,740,723

[45] June 19, 1973

[54] INTEGRAL HIERARCHICAL BINARY STORAGE ELEMENT

[75] Inventors: William F. Beausoleil, Irving T. Ho, Wilbur D. Pricer, all of Poughkeepsie, N.Y.

[73] Assignee: International Business Machines Corporation, Armonk, N.Y.

[22] Filed: Dec. 28, 1970

[21] Appl. No.: 101,658

[52] U.S. Cl. ............... 340/172.5, 307/238, 307/303

[51] Int. Cl. ......................... G11c 9/00, G11c 11/34

[58] Field of Search ................... 340/172.5, 173 R; 307/303, 238

[56] References Cited

UNITED STATES PATENTS

| | | | |
|---|---|---|---|
| 3,641,511 | 2/1972 | Cricchi et al. | 307/238 |
| 3,460,094 | 8/1969 | Pryor | 340/172.5 |
| 3,597,641 | 8/1971 | Ayres | 307/303 |
| 3,588,845 | 6/1971 | Ling | 340/172.5 |
| 3,609,712 | 9/1971 | Dennard | 307/238 |
| 3,569,938 | 3/1971 | Eden et al. | 340/172.5 |
| 3,588,839 | 6/1971 | Belady et al. | 340/172.5 |
| 3,351,909 | 11/1967 | Hummel | 340/172.5 |
| 3,341,817 | 9/1967 | Smeltzer | 340/172.5 |
| 3,560,935 | 2/1971 | Beers | 340/172.5 |
| 3,376,555 | 4/1968 | Crane et al. | 340/172.5 |

*Primary Examiner*—Gareth D. Shaw
*Attorney*—Hanifin & Jancin and Robert W. Berray

[57] ABSTRACT

A binary data storage system of a data processing system is comprised of electrically independent storage modules, each module comprised of a matrix of electrically independent storage devices, with each storage device being an integral circuit element comprised of a first matrix of binary storage cells and associated selection circuitry, and a second matrix of binary storage cells and associated selection circuitry. The design of the binary storage cell of the first matrix and associated selection circuitry is such that a large number of storage cells can occupy a unit space but provide relatively slow access to the binary data manifested by the cell. The second matrix of binary storage cells and associated selection circuitry is formed in such a way that a relatively small number of storage cells are provided with a relatively high speed of access to the binary data manifested in the storage cells. Each storage device has a single terminal for the transfer of a single binary bit to or from the storage device. Each of the previously mentioned storage modules also has a single terminal for the transfer of a single binary bit to or from the storage module. All of the terminals of the storage devices are connected in common to the terminal of a storage module. One storage module is provided for each binary bit of a data processing system binary data word to be transferred between the storage system and the central processing unit of the data processing system. The most recently accessed binary data will be manifested in the high speed storage cells of the second matrix such that when address information is sent to the storage system, a large percentage of the requests for access to the storage system will find the data in the high speed portion of each of the storage devices providing an effective access time to the data in the storage system significantly faster than if the access to the data were required to be made to the storage cells of the first matrix.

2 Claims, 22 Drawing Figures

INVENTORS
WILLIAM F BEAUSOLEIL
IRVING T HO
WILBUR D PRICER

BY Robert W. Berray

ATTORNEY

| WORD SELECT | | | | | | BIT SELECT | | | | CHIP SELECT | | | | | | | BYTE | | |
|---|---|---|---|---|---|---|---|---|---|---|---|---|---|---|---|---|---|---|---|
| W5 | W4 | W3 | W2 | W1 | W0 | b3 | b2 | b1 | b0 | C6 | C5 | C4 | C3 | C2 | C1 | C0 | B2 | B1 | B0 |
| BOOK ADDRESS | | | | | | | PAGE ADDRESS | | | 1K BYTE / PAGE | | | | | | | | | |

| | | | |
|---|---|---|---|
| SHIFT 120 | CA | CONTROL | |
| SHIFT 121 | CB | $\overline{\text{CONTROL}}$ | |
| SHIFT 120 TO 121 | CB | $\overline{\text{CONTROL}}$ | |
| SHIFT 121 TO 120 | CA | $\overline{\text{CONTROL}}$ | |
| WRITE 121 | CA | CONTROL | WRITE |
| WRITE 120 | CB | $\overline{\text{CONTROL}}$ | WRITE |

INTEGRAL HIERARCHICAL BINARY STORAGE ELEMENT

BACKGROUND OF THE INVENTION

1. Field of The Invention

This invention relates to binary data storage, and more particularly to an integral hierarchical storage device suitable for constructing a binary data storage system exhibiting characteristics of a large capacity/slow access storage system coupled to a low capacity/high speed storage system.

2. Prior Art

The problems encountered in attempting to cause a high speed digital data processing system to operate efficiently with a data storage system, and one solution to this problem, is disclosed in an article entitled "Concepts For Buffer Storage" by C. J. Conti, in the IEEE Computer Group News, March, 1969. The solution proposed in this article involves the hardware controlled interconnection of a large slow-speed three dimensional core storage with a relatively small high-speed buffer storage or cache manufactured using integrated circuit technology.

The philosophy behind the hardware control of the transfer of data between the core backing storage and the integrated circuit buffer storage is to cause the central processing unit to believe it was accessing data constantly from the high speed buffer which had a speed of access equivalent to one or two cycles of the central processing unit. When the CPU provides address information to the storage system, means are provided for determining whether or not the addressed data has been previously transferred from the backing storage to the buffer storage. If the data is residing in the buffer storage at that time, high speed access is obtained. When the data is not found in the buffer storage, the hardware control is rendered effective to obtain the data from the backing store for insertion in the high speed buffer.

The organization of data within the backing store and buffer store is such that one particular word is transferred from the backing store to the buffer store. A plurality of words comprising a block containing the desired word are also transferred to the buffer storage on the assumption that subsequent requests for data would come from the same block of data. A certain amount of inefficiently is encountered in the various techniques disclosed in this article because of the relatively small number of words that can be transferred from the backing store to the buffer store each time the backing store is cycled. In other words, to transfer the entire block of data to the buffer store requires many cycles of backing storage.

Another method of matching the speed of a central processing unit with the speed of the storage system with which it is working is to construct the storage system utilizing integrated circuits having the same characteristics as the integrated circuits within the central processing unit. A great deal of literature has been produced describing various storage systems constructed by various integrated or monolithic circuit techniques. Utilizing these techniques, binary data storage cells are produced on an element usually referred to as a chip.

Various design trade offs are possible in constructing a matrix of storage cells on a storage chip. The considerations include the speed of access to the data within a particular storage cell, the number of storage cells on a chip, the power required, and heat produced by cycling the circuitry on the chip. When very high speed of access is desired from a chip, the number of storage cells on the chip must be significantly reduced, and when quantity of storage cells on a chip is desired, sacrifices must be made in the design to the point where very slow access to the information results.

Circuit speeds of present day data processing systems are such that the requirement for interconnecting two circuits by a length of wire creates a significant delay in the transfer of signals from one circuit to another. Further, in present day technologies with regard to integrated or monolithic circuits, restrictions are placed on the number of terminals which can be spaced on the chip for controlling the circuits on the chip. An attempt to construct the backing store/buffer store combination utilizing two different integrated circuit technologies for the two different stores would create a situation of requiring interconnecting wires between boxes, circuit conversions, contacts, drivers, receivers, and amplifiers resulting in undesirable delays. Further, utilization of presently announced integrated circuit storage devices in a configuration like that represented by the interconnection of a core storage and integrated circuit high speed buffer would still create the undesirable property of requiring a plurality of cycles of the backing store to transfer blocks of data words associated with a desired word.

SUMMARY OF INVENTION

In accordance with the present invention, an integral hierarchical storage device is provided which is constructed to include, as a single unit, a first matrix of binary data storage cells and associated selection circuitry and a second matrix of binary data storage cells and associated selection circuitry wherein the first matrix has a large number of data storage cells with slow access time and the second matrix is comprised of a small number of binary data storage cells with fast access time.

The invention also provides a binary data storage module which has a plurality of the integral hierarchical storage devices. Each of the storage devices has a single terminal, and each module has a single terminal for the transfer of a single binary bit. All of the terminals of the devices are connected in common to the terminal of the module. To construct a storage system, a number of storage modules are provided corresponding to the number of binary bits to be transferred between the storage system and the using system.

A feature of a storage system constructed with storage devices of the present invention, is that the effective access time to data in the storage system is significantly fast in view of the fact that the most recently used data will be located in the storage cells of the second storage matrix. Further, the organization of the storage system is such that each time a particular data word is to be transferred between the backing storage portion, and the high speed buffer portion, an entire large-sized block of data, including the desired word, is simultaneously transferred from the backing store to the buffer store portion of the storage system. Since the backing store and buffer store portion of the storage system are constructed on a single device, interconnecting circuit delays are not encountered and multiple cycling of the backing store for the transfer of a block of data is not required.

BRIEF DESCRIPTION OF FIGURES

For a complete understanding of the present invention and for further advantages thereof, reference may be had to the following description taken in conjunction with the accompanying drawings in which.

DETAILED DESCRIPTION OF PREFERRED EMBODIMENT

Figure 1:
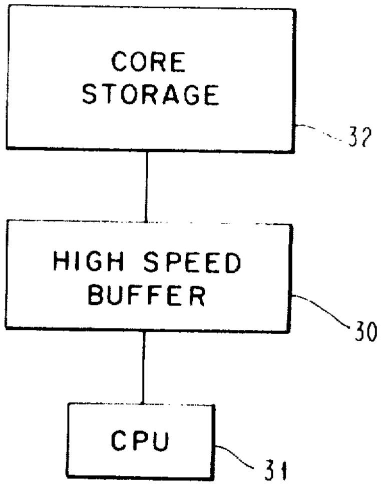
FIG. 1 is a representation of prior buffer/backing store configurations.

FIG. 1 is a representation of the concept disclosed in the above mentioned article by C. J. Conti. A high speed small capacity buffer 30 is interconnected between a central processing unit (CPU) 31 and a large capacity, slow access core storage 32. The speed of operation of the circuits within the buffer 30 are essentially the same as the speed of the circuits found in the CPU 31. Studies have indicated that a high percentage of requests for data by the CPU 31 can be found in the buffer 30 if the buffer 30 is caused to contain the most recently used data within a predetermined number of blocks of data. Occasionally, the CPU 31 does not find the requested data in the high speed buffer 30 and must then initiate an access to the core storage 32 for the desired data. When the particular word of data is returned to the CPU 31 from the core storage 32, associated data which forms a block of data is also returned to the high speed buffer 30 on the assumption that the next data required by the CPU 31 will be within the same block of data. Various techniques have been incorporated into data processing systems for controlling the displacement of data from the high speed buffer when new data is inserted.

Figure 2:
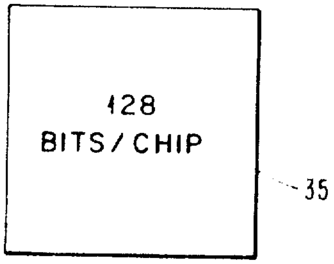
FIG. 2 is a representation of a prior art monolithic storage chip.

The other method of matching binary storage speeds with CPU speeds is represented in FIG. 2. A circuit chip 35 is subjected to a monolithic circuit manufacturing process which places on the chip 35 binary data storage cells, associated selection and driver circuits, and sense amplifiers for the transfer of binary data to and from the monolithic storage cells. Various manufacturing techniques are presently available for the production of monolithic storage devices. A number of design parameters dictate the number of storage cells which can most efficiently be placed on a particular monolithic circuit chip. In view of various power, heat, and speed requirements, a common integral monolithic storage chip can contain a matrix of 128 storage cells or bits of binary information. The above mentioned parameters, create a basic design consideration known as access time. Access time is a combination of the time required for the circuitry on the chip 35 to decode a number of address bits, energize drivers, cause the storage cell to respond, and enable the sense amplifiers to provide a usable signal at the output.

Figure 3:
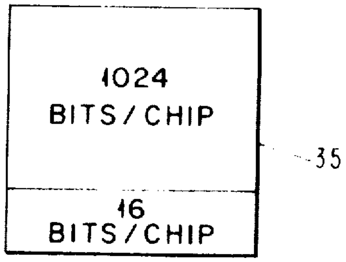
FIG. 3 is a representation of a monolithic circuit chip incorporating the concepts of the present invention.

FIG. 3 is a representation of the concept of the present invention. Namely, an integral hierarchical storage device is provided. The storage device can be any form of electrically independent integral element, such as a monolithic circuit chip 35 like that shown in FIG. 2. The essential feature of the present invention is to construct on the monolithic circuit chip a first matrix of binary data storage cells and associated selection circuitry, a second matrix of binary data storage cells and associated selection circuitry, and the necessary terminals for receiving address information, power, input/output terminals, and other control signals. Further, the interconnection of the first and second matrix is accomplished on the monolithic storage chip 35.

The configuration of the first matrix can be such that a manufacturing technique can be utilized to produce a backing store portion which provides high density, low power, but which results in slow speed. The second matrix on the monolithic storage chip 35 can be manufactured with any technique which ultimately results in a matrix of storage cells which can provide relatively high speed of access to the storage cell. The speed of the backing store portion or the buffer store portion can be achieved with optimum designs for power, density, heat dissipation, and the extent of decoding required to select a particular one of the cells within the two matrices.

Figure 4:
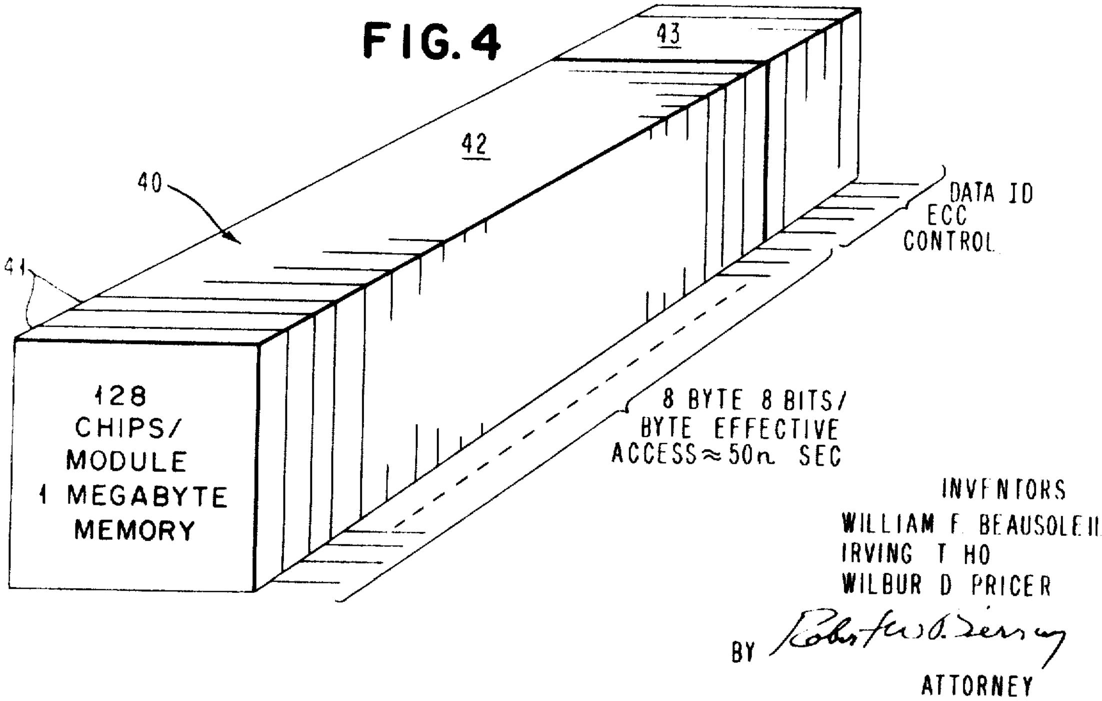
FIG. 4 is a representation of an entire data storage system incorporating the present invention.

FIG. 4 is a representation of a binary data storage system constructed utilizing the integral heirarchical storage device of the present invention depicted in FIG. 3. The storage system 40, in accordance with a preferred configuration of the present invention, will be utilized with a data processing system which has the ability to address a particular one of a plurality of units of data called a byte. A byte of binary data consists of eight binary bits. The size of the storage system, to be more clearly defined, is such that it can contain one million bytes of data, each byte of which can be individually addressed.

The organization of the storage system 40 is such that although the access to data in a particular one of the storage cells of the backing store cell matrix may take several hundred nanoseconds, access to eight bytes of data from the storage system can be achieved from the high speed buffer portion of each integral hierarchical storage device in 50 nanoseconds or less depending on the circuit technologies used. Further, the organization of the storage system is used that each time eight bytes of data are accessed from the backing store portion, these eight bytes of data will be included in a 1,024 byte block of data moved simultaneously into the high speed portion of all of the integral hierarchical storage devices. The organization of the embodiment to be described is such that the high speed portion of the storage system 40 will contain 16K bytes of data. (The designation K is used in the art to designate 1,024).

The storage system 40 of FIG. 4, is constructed utilizing, for each bit of an eight byte data word, a separate storage module 41. Each storage module, in the preferred embodiment of the invention to be described, will contain a matrix of 128 hierarchical storage devices constructed in accordance with the configuration shown in FIG. 3. The storage system 40 will be comprised of a number of storage modules equal to the number of data bits in the data word contained in a data storage section 42. Another section 43 of modules will be provided to incorporate the internal controls of the storage system 40, error detection and correction capability, and data identification controls to provide one of the various techniques mentioned in the above referenced article by C. J. Conti with regard to means to identify the data which is manifested in the high speed buffer portion of the hierarchical storage devices.

Figures 5, 6:
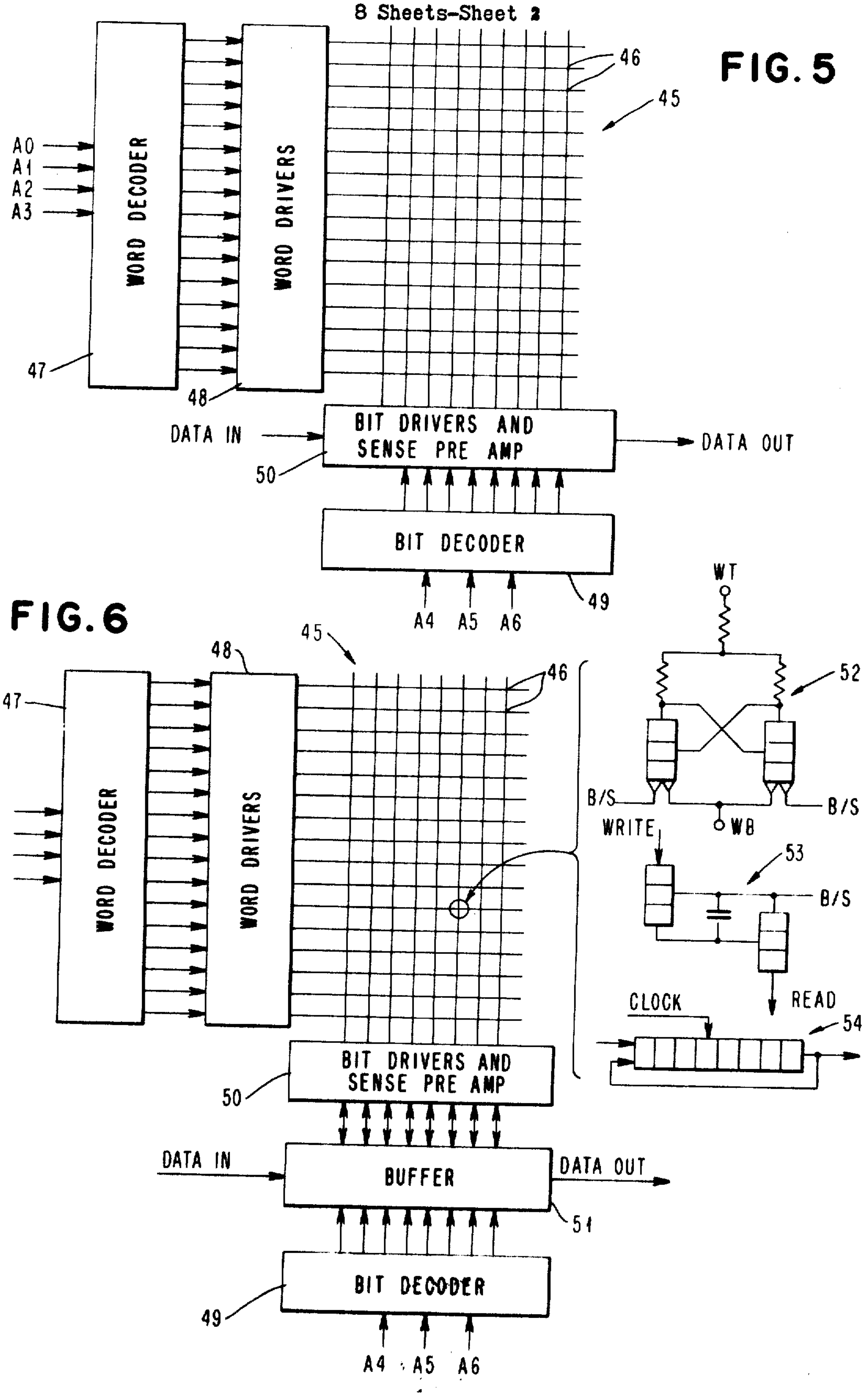
FIG. 5 is a logical representation of prior art monolithic random access storage chips.
FIG. 6 is a logical representation of a monolithic storage chip incorporating the concepts of the present invention.

FIG. 5 is a schematic representation of a common configuration for prior art storage devices constructed on monolithic circuit chips such as shown in FIG. 2. Each of the monolithic storage chips would contain a matrix 45 of binary data storage cells, a binary data storage cell being located at each of the intersections 46. Also included on the monolithic storage chip would be terminals for receiving binary address bits A0–A6. By means of a word decoder 47 and word drivers 48, address bits A0–A3 would be decoded to energize one of 16 word drivers to thereby cause the data in a particular one of the horizontal rows of data cells to produce signals representing binary 0's or binary 1's on all the eight vertical lines of the matrix. Bit decoder 49 and bit drivers and sense preamp 50 will be effective in response to address bit A4–A6 to permit the binary data to be stored in, or read out from, a particular one of the eight storage cells in the row accessed by the word decoder 47.

FIG. 6 shows the same memory organization as that shown in FIG. 5 with the exception of the inclusion of additional circuitry to provide a buffer 51 in the form of latch or trigger circuits for the purpose of storing the information found on all of the eight vertical lines of the storage device. The access time to the array 45 is now slightly increased to the time required to latch-up the data in the selected horizontal row of storage cells 46. Access time to data within a particular storage cell of the matrix 45 is a function of the time required for the word decoder 47 to resolve the combination of address bits A0–A3. By utilizing techniques disclosed in the above mentioned article, a particular one of the storage cells in the buffer 51 can be selected utilizing only three binary address bits A4–A6, the decode time of which is less than that required to decode bits A0–A3. In addition to the decoding of A0–A3, drivers must be energized, sense lines sampled, and latches set. Therefore, the access time to binary data within the buffer 51 will determine to a high degree the effective performance of the entire storage system. This is because there is a high probability that subsequent requests for data to the matrix 45 will be for data already accessed and latched into the buffer 51.

As indicated earlier, intersection 46 of a horizontal word drive line and vertical bit sense line contains a monolithic storage cell. The circuit design of a particular cell can take many forms. Indicated in FIG. 6 are three general forms of storage cells which can be implemented at the intersections 46. Circuit 52 would be classified as a static storage cell. That is, once binary information has been stored in the cell to represent a binary one or a binary zero, the information will be retained without any further action until changed by subsequent writing into the cell of different binary information. Circuit 53 represents another form of storage cell which would be generally classified as dynamic. A dynamic storage cell relies on the charging and discharging of capacitance to reflect the binary information stored. When the capacitor has been charged to represent a binary 1, leakage of the charge would subsequently reflect a binary 0. Therefore, the charge on the capacitor within the storage cell must be periodically regenerated. In the form of the present invention, to be subsequently discussed, it is this form of storage cell which provides the most efficient operation when considering the various parameters such as number of cells of density on a chip, power, heat, and speed. The circuit 54 is a representation of a shift register which could be comprised, for example, of eight individual storage locations. The shift register stages could take a form of static or dynamic storage. Further control information would be required if the shift registers were constructed at the intersections 46 in order to identify individual items of data within each shift register.

Figure 7:
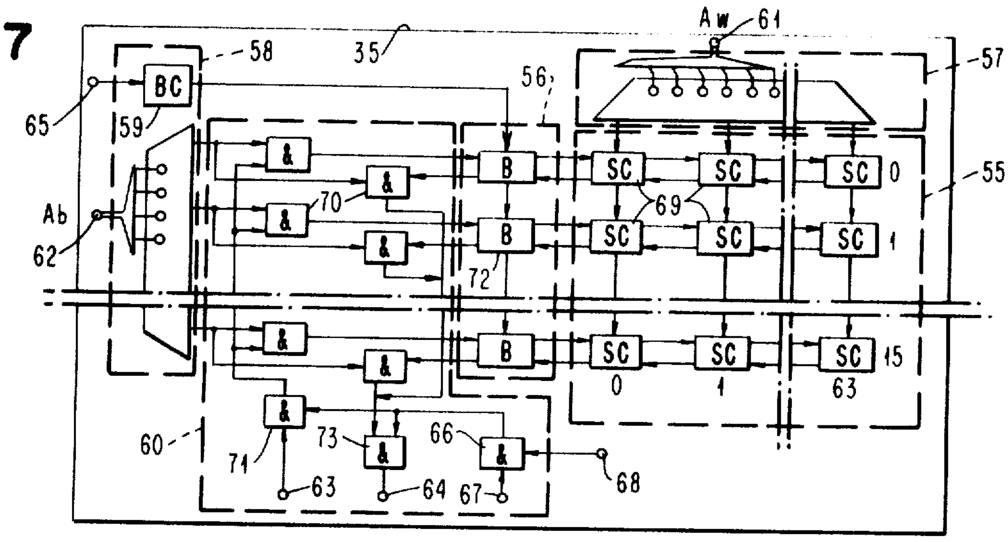
FIGS. 7, 8 and 9 are schematic and logical representations of various configurations of integral hierarchical storage devices in accordance with the present invention.
Figure 8:
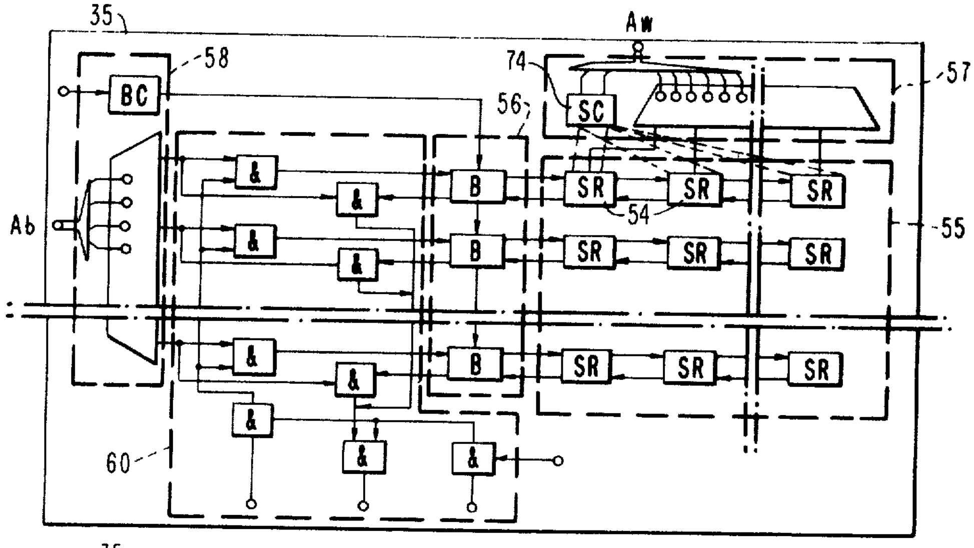
Figure 9:
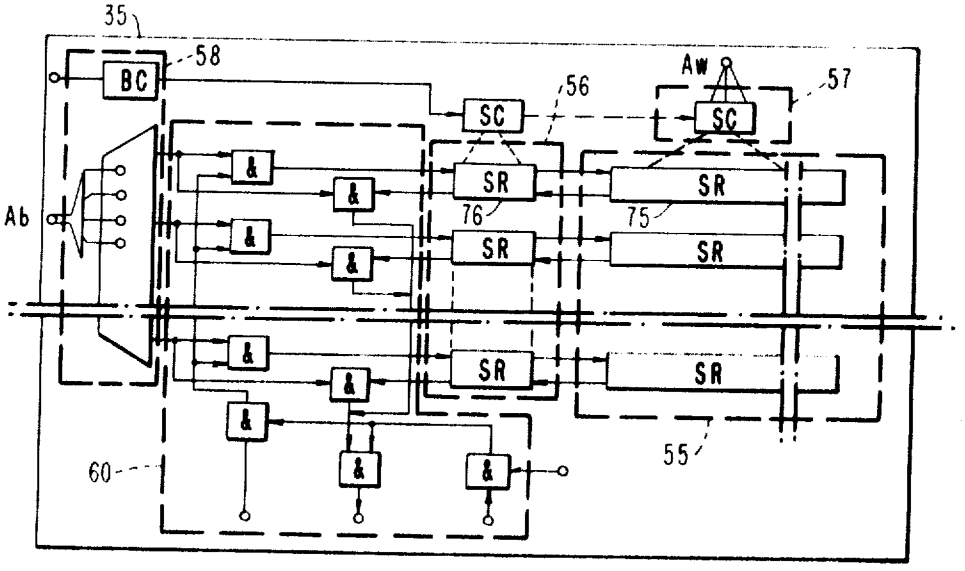

FIGS. 7, 8 and 9 are representations of the various forms that an integral hierarchical storage device on a monolithic chip 35 can take in accordance with the general outline specified in connection with FIGS. 3 and 6. The general organization includes the following. There will be provided a first matrix 55 of binary data storage cells and a second matrix 56 of binary data storage cells. First selection means 57 will receive a number of binary address bits Aw for energizing word drive lines such as shown in FIG. 6. Second selection means 58 is provided which receive address bits A*b* for application to a bit decoder 49 as shown in FIG. 6. In addition, the second selection means includes buffer control logic 59 for receiving internal signals for various controls of the operation of the second matrix of storage cells 56. Input/output means 60 are provided for the transfer of binary data to and from storage cells of the second matrix 56 in accordance with selections made by the second selection means 58.

To be more fully explained, a plurality of integral hierarchical storage devices as shown in FIGS. 7 – 9 will be formed in a matrix to construct a storage module. Each of the storage devices will have a number of terminals connected in common and these will be discussed in connection with FIG. 7. Word selection address bits will be received at terminal 61, and address bits for energizing bit selection will be received at terminal 62. Data to be stored in each storage device will be received at terminal 63, and binary data to be read out to a utilizing system will be on a terminal 64. Internal control of the buffer operation will be received on a terminal 65. When the storage devices such as shown in FIG. 7 are formed into a two-dimensional matrix, selection of a particular one of the devices in the matrix will be accomplished at an AND circuit 66 in response to selection signals on terminals 67 and 68.

A preferred form of the storage system constructed in accordance with the present invention will be essentially like that shown in FIG. 7. The first matrix of each device will be formed in a two-dimensional array which will be comprised of 64 word lines 0–63 and 16 bit lines 0–15. At each intersection of a word and bit line, the storage cell 69 is preferably of the type shown at 53 in FIG. 6. A second configuration could include a storage cell such as circuit 52 in FIG. 6. Depending on the form of the storage cell 69, the interconnection between the first matrix 55 and the second matrix 56 may include only interconnecting wires in the case of a static cell, but, as in the case of the preferred embodiment, an intermediate transfer register will be provided for interconnecting the first and second matrix.

In order to make a selection of one of the 64 word lines, the first selection means 57 must receive six binary address bits on terminal 61. In order to select one out of the 16 binary bits on the bit lines, second selection means 58 must receive four binary address bits at terminal 62. In response to the second selection means 58, particular AND circuits 70 will be enabled to transfer data to the second matrix 56 from an AND circuit 71 enabled by the input data and device selection by AND circuit 66. For reading out of a particular one of the second matrix storage devices 72, an AND circuit 70 will be enabled to provide an input to an AND circuit 73, enabled by the device selection AND circuit 66 for providing an output on terminal 64.

FIG. 8 is a representation of an integral hierarchical storage device constructed with shift registers such as 54 in FIG. 6 at the intersection of the word and bit drive lines. In addition to requiring the first selection means 57 to select a particular row of shift registers 54, additional shift control logic 74 must be provided for identifying particular locations within each of the shift registers 54.

FIG. 9 represents another embodiment of the present invention to be described subsequently, wherein the first matrix of storage cells 55 is shown essentially as being only one row of cells wherein each cell of the first matrix is comprised of a shift register 75 containing a large number of shift register stages. Each shift register 75 of the first matrix is interconnected with a corresponding shift register 76 having a much smaller number of shift register stage. Although shift register 75 and shift register 76 may be constructed of the same technology, and have the same speed capability, the decrease in access time to data from the integral hierarchical storage device is achieved by the ability to determine more rapidly the contents of the small shift register 76 as opposed to the relatively long time required to obtain access to a particular one of the stages of the large shift register 75.

Figures 10, 11:
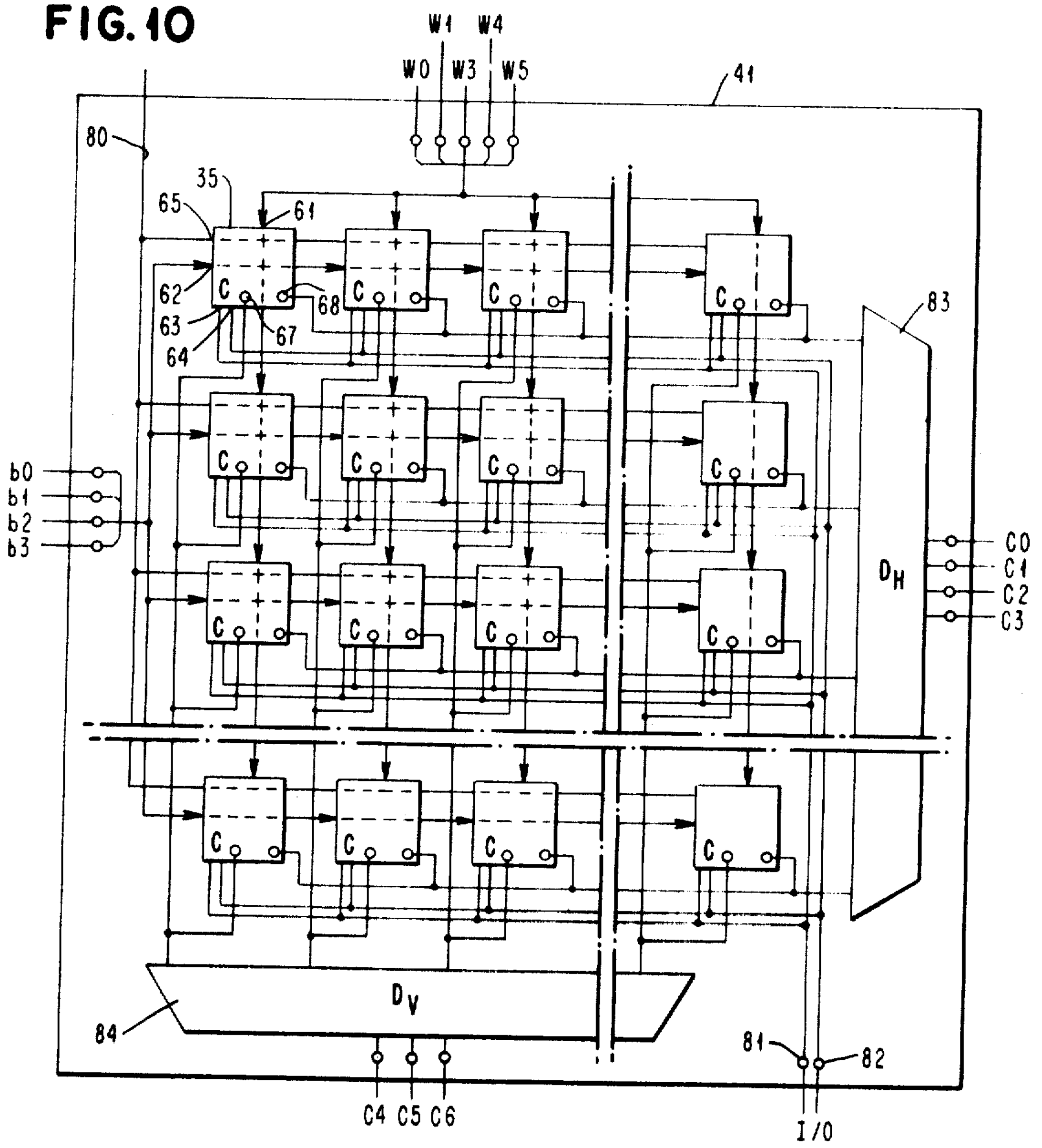
FIG. 10 is a schematic representation of a configuration for a storage module comprised of a matrix of integral hierarchical storage devices, each of which can take the form shown in FIGS. 7 – 9.
FIG. 11 shows the designation of binary address bits utilized for controlling access to data within a storage system constructed in accordance with the present invention.

Each storage module 41 of FIG. 4 utilized to construct an entire storage system 40, is preferably as shown in FIG. 10. An array of hierarchical storage devices or chips 35 will be arranged on the module 41. Terminals identified on a particular chip 35, described in connection with FIG. 7, are shown in FIG. 10. Almost all of the terminals of the storage devices 35 are connected in common. These include terminals 61 which receive word selection address bits W0–W5, bit selection address bits *b*0–*b*3 at terminal 62, input/output terminal 63/64, and high speed buffer control signals at terminal 65.

Each module 41 will have a terminal 80 provided for receiving buffer control signals from the data ID and control section 43 of FIG. 4. The transfer of binary data to and from each storage module is accomplished at an input terminal 81 and an output terminal 82.

As can be seen, in response to address and control signals received at each storage module 41, all of the integral hierarchical storage devices 35 will respond in the same way. That is, address bits W0–W5 and *b*0–*b*3 and the buffer control signals on termnal 80, will cause all storage devices 35 to provide access to a particular one of the storage cells in the first slow-speed matrix 55 for subsequent utilization from the storage cells of the high-speed storage matrix 56.

As shown in FIG. 10, the input/output terminals 63/64 of each hierarchical storage device 35 are connected in common to the terminals 81 and 82 to the storage module. In order to cause the storage module 41 to provide access to a single binary bit for the purpose of access to a particular word in the storage system 40 of FIG. 4, integral hierarchical storage device selection means are provided for rendering only a single one of the storage devices 35 effective. As shown in FIG. 10, the storage devices 35 are arranged in a matrix. Selection of a particular one of the storage devices 35 on the module 41 is accomplished by a horizontal decoder 83, and a vertical decoder 84 which respond to address bits C0–C3 and C4–C6 respectively.

Decoder 83 will decode address bits C0–C3 to energize one of 16 horizontal selection lines connected to terminal 68 of all storage devices 35. Vertical decoder 84 will respond to address bits C4–C6 to energize one of eight vertical selection lines connected to terminal 67 of all storage devices 35. Energization of a particular horizontal and vertical selection line will be effective at AND circuit 66 of the selected storage device 35 to thereby enable the input AND gate 71 or output AND gate 73 of the selected storage device 35 for communication with the using system through terminals 81 or 82.

The total capacity of the storage system 40 of FIG. 4 can now be calculated. There are 64 storage modules 41, each containing a matrix of 128 storage devices 35, each storage device 35 being comprised of 1,024 storage cells, for a total of 1,048,576 bytes. The capacity of the high speed buffer portion of the memory system can also be calculated. Each storage device 35 has 16 high speed buffer positions. Each module 41 contains 128 storage devices. The 64 storage modules therefore provide 16K bytes of high speed storage for the storage system 40.

FIG. 11 is a representation of the binary address bits utilized to access a particular one byte out of the 1,048,576 bytes in the storage system 40. Address bits B0–B2 designate one of the eight bytes accessed from the storage system 40. Binary bits C0–C6 select a particular storage device 35 on each module, binary bits *b*0–*b*3 select one of the 16 bit lines, and bits W0–W5 select one out of 64 word drive lines. As can be seen from FIG. 11, 1K sequential bytes of data can be accessed from the high speed portion of the storage system by merely changing the input to decoders 83 and 84 on each module to select a different storage device 35. There is no requirement to change the setting of the bit select lines or word select lines in each of the storage devices 35. Only the four bit select address bits *b*0–*b*3 need be changed to provide access to a different storage cell within the high speed buffer portion of each storage device 35. Therefore, 16K bytes of data are available from the high speed portion of the storage system.

A further significant feature of the storage configuration, is that when it is necessary to transfer data from the slow speed storage cell matrix by means of energizing the row and bit lines of each storage device 35, all 128 storage devices 35 on all 64 modules 41 are rendered effective such that 1K bytes of data are moved simultaneously from the slow speed storage cell matrix to the high speed storage cell matrix.

Figure 12:
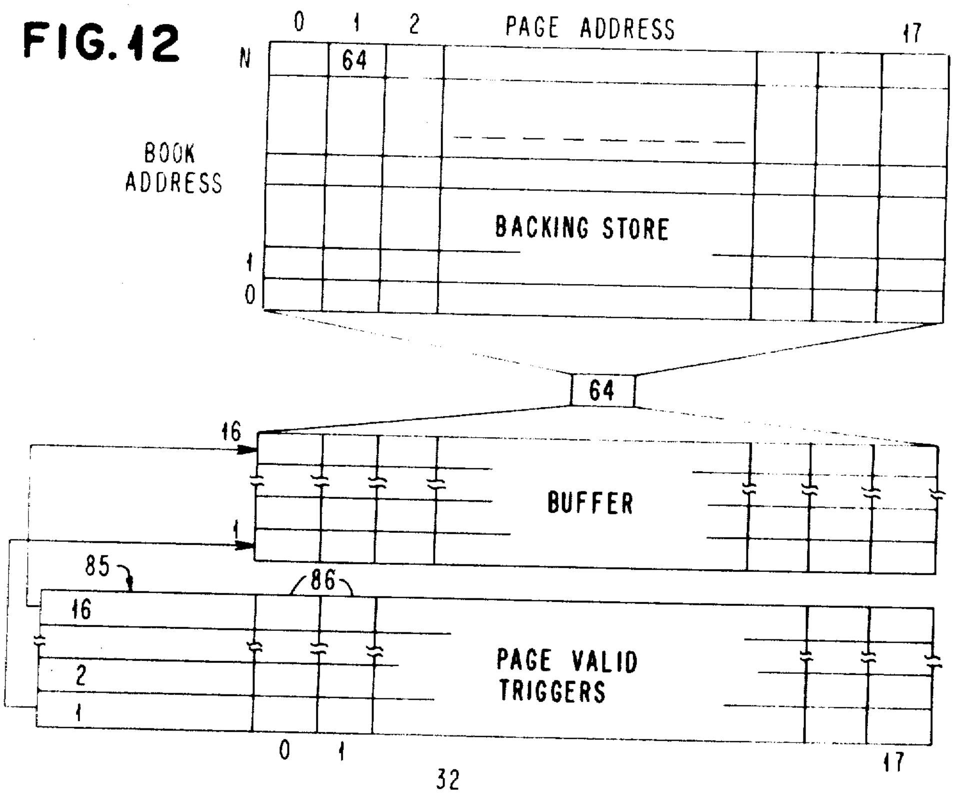
FIGS. 12 and 13 show the logical division of a backing store and buffer store combination into books and pages and two techniques for determining the identification of the data contained in the high speed buffer portion of the storage system.
Figure 13:
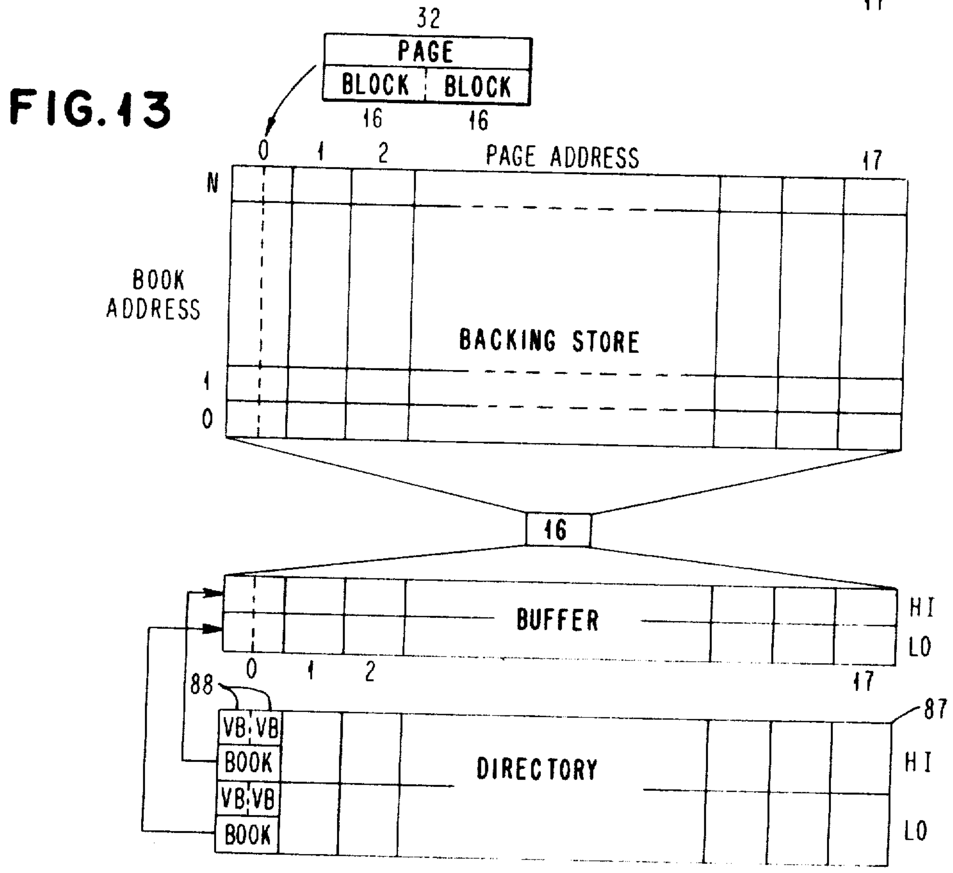

FIG. 11 shows designation of various of the address bits as being book address bits and page address bits. The designation book and page is used in some literature when discussing the concept of buffer backing storage systems to describe the logical segmentation of the two storage devices. The term sector and block are also sometimes used. FIGS. 12 and 13 will be utilized to discuss two forms of book and page storage segmentation and two forms of buffer control mentioned generally in previous discussions. Buffer control generally refers to the necessity for identifying the data which has been transferred from the backing store to the buffer store to determine whether or not access can be achieved from the high speed buffer store. FIG. 12 is a representation of the technique utilized in the IBM System/360 Model 85 and FIG. 13 is a representation of the technique utilized in the IBM System/360 Model 155. In FIG. 12, the backing store, which is a three-dimensional core memory, is logically divided into a number of books O-N. Each book is divided into a number of pages 0-*n*. Each page within the backing store consists of 64 bytes of data. High order bits of a data processing address will designate a particular book, next lower order bits will designate one of the pages, and the lowest order bits will designate particular bytes within each page.

The high speed buffer associated with the backing store is also divided into books and pages. The buffer, being a smaller, high-speed monolithic store is only capable of storing information from 16 books. There is a location for each page of a book contained within the high speed buffer. The interconnection of the backing store and buffer store is such that for any access to the backing store, 64 bytes of data are transferred to the high speed buffer.

In order to determine the identity of the data in the high speed buffer of FIG. 12, 16 associative registers 85 are provided for retaining the address information of the identity, in the form of the backing store book address of the books having information contained in the high speed buffer. As indicated earlier, each access to the backing store only provides information from one page. Therefore, for each register indicating the identity of a book contained in the high speed buffer, there is an associated valid trigger 86 which identifies the pages which have been accessed into the high speed buffer associated with that particular book. Each time data is to be accessed in the storage system, the book address bits of the storage address are compared with the contents of the 16 associated registers 85. If information from the book is contained in the high speed buffer, one of the 16 registers will indicate a match and identify that portion of the high speed buffer which contains the data. Not only must the book addresses compare, but also the valid trigger associated with the desired page of the book must be set to indicate that the data is in the buffer. If the page has not been previously accessed, the 64-byte page will be accessed and placed in its corresponding location within the book in the buffer. If the book address bits do not match with the contents of any associative register 85, various algorithms can be applied to eliminate from the high speed buffer the data from the book which is likely not to be used in the near future. This elimination can be performed logically by resetting all of the page valid triggers 86 associated with the section of the high speed buffer to receive new information. When the new data is accessed, the associative register is up-dated with the new block address bits.

FIG. 13 shows another form of buffer control. Once again, the backing store is divided into books 0-N and pages 0-*n*. In this particular configuration, each page is comprised of 32 bytes of data divided into two blocks of data each containing 16 bytes. The interface between the backing store and the buffer is designed only to transfer 16 bytes of data for each access to the backing store.

In the technique of buffer control shown in FIG. 13, a directory 87 is provided. The directory 87, and the high speed buffer are divided logically into a high (HI) and low (LO) section. The buffer and directory 87 are further divided into pages 0-*n*. The identity of the data in the high speed buffer is determined from the entries in the directory 87. In this technique, page 0 from any of the books 0-N will be placed either in the high or low portion of the high speed buffer associated with page 0. Since page 0 of all the books will always reside in either the high or low portion of location 0 of the buffer, the directory must identify the book from which the page was obtained. Therefore, as a page of data is moved into the high speed buffer, the address bits which identify the book from which it came, are stored in the directory. The interface between the backing store and the high speed buffer is only capable of transferring 16 bytes such that independent accesses to the two blocks within a page must be made, and valid triggers 88 are required to indicate which of the blocks have in fact been transferred to the high speed buffer.

In FIG. 13, every access to data in the storage system, provides book address bits, page address bits, block address bits, and byte address bits. The page address bits are utilized to access the directory 87. The two entries in the directory, associated with the page, reflecting the identity of the books in the high speed buffer, are compared with the book address of the requested data. If the data requested is in the high speed buffer, one of the two book address bits from the directory will match the book address bits of the requested data and indicate that the data is in either the high or low section at the designated page, block, and byte location within the high speed buffer. When the directory 87 is accessed with the page address bits, and the book identification address bits in the directory do not match the book address of the requested data, any suitable replacement algorithm can be utilized to invalidate the information in the high speed buffer, in either the high or low section, for inserting information from the page of the requested book. As the new data associated with the requested page is inserted in the high speed buffer in the high or low section, the identity of the book from which the page came from backing store, is stored in the appropriate directory location.

Figures 14, 15:
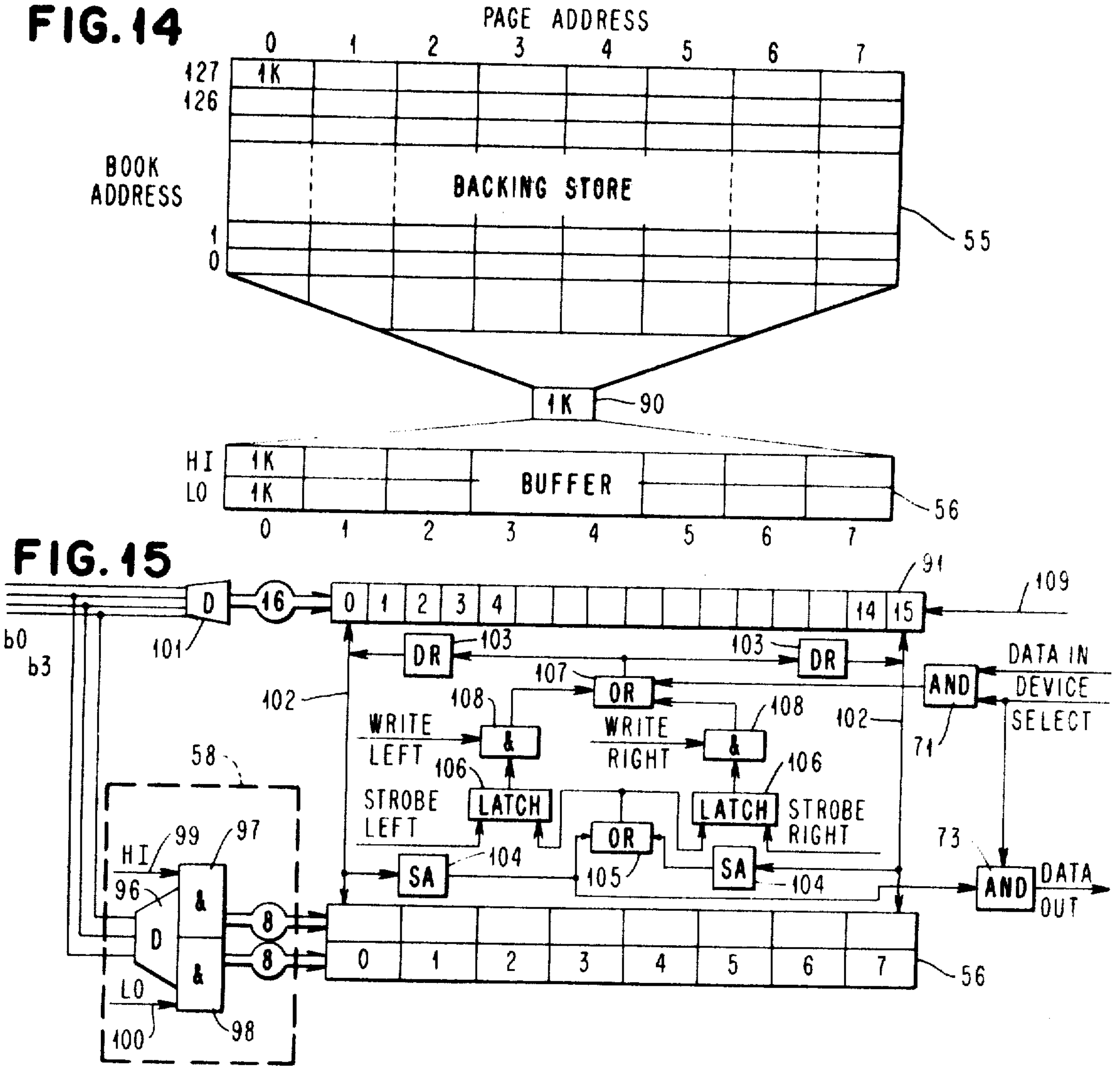
FIG. 14 shows the logical division of the backing and buffer store into books and pages in accordance with a preferred embodiment of a storage system utilizing the present invention.
FIG. 15 is a more detailed logic diagram of the manner in which data accessed from the slow backing store is inserted in storage cells of the high speed portion of the integral hierarchical storage device for subsequent retrieval of the data from the high speed storage cells.

FIG. 14 shows the logical segmentation of a backing store and buffer store into books and pages utilizing the preferred form of the present invention described in connection with FIGS. 7 – 10. The 1 megabyte memory shown in FIG. 4 will be logically divided into 128 books, each book consisting of eight pages, and each page consisting of 1,024 bytes. The logical segmentation of the high speed buffer portion of the memory system will be implemented in accordance with the technique discussed in connection with FIG. 13. That is, the buffer will be segmented into a high and low section whereby 1K-byte pages from two out of the possible 128 books will be retained in a section of the high speed buffer associated with the particular page number. Therefore, a directory must be implemented in accordance with FIG. 13 on a module in section 43 of FIG. 4 dedicated to data identification and control.

The configurations discussed previously in connection with FIGS. 7 – 10 have referred to the fact that each integral hierarchical storage device is comprised of 64 word lines and 16 bit lines. These designations are referred to by the address bit designations in FIG. 11. The logical segmentation of the backing store and buffer store shown in FIG. 14 is achieved by causing one of the bit select address bits to be utilized in the designation of a book address. This has the effect of pairing two bit lines, effectively creating 128 books, each with eight pages. The logical implementation of this will be discussed subsequently in connection with FIG. 15. Generally, for example, bit lines 0 and 1 of each hierarchical storage device will be combined into page 0, and always be transferred to either the high or low portion of section 0 of the high speed buffer.

As mentioned previously, and as indicated at 90 in FIG. 14, each time the storage system is called on to transfer data from the slow speed matrix of each hierarchical storage device, all 128 integral hierarchical storage devices on all 64 storage modules are activated resulting in the transfer of 1K bytes of data into the high speed buffer section of the storage system. This provides a significant increase in the amount of information transferred between the backing store and the high speed buffer for each access to the backing store over the prior art techniques shown in FIGS. 12 and 13.

Figure 16:
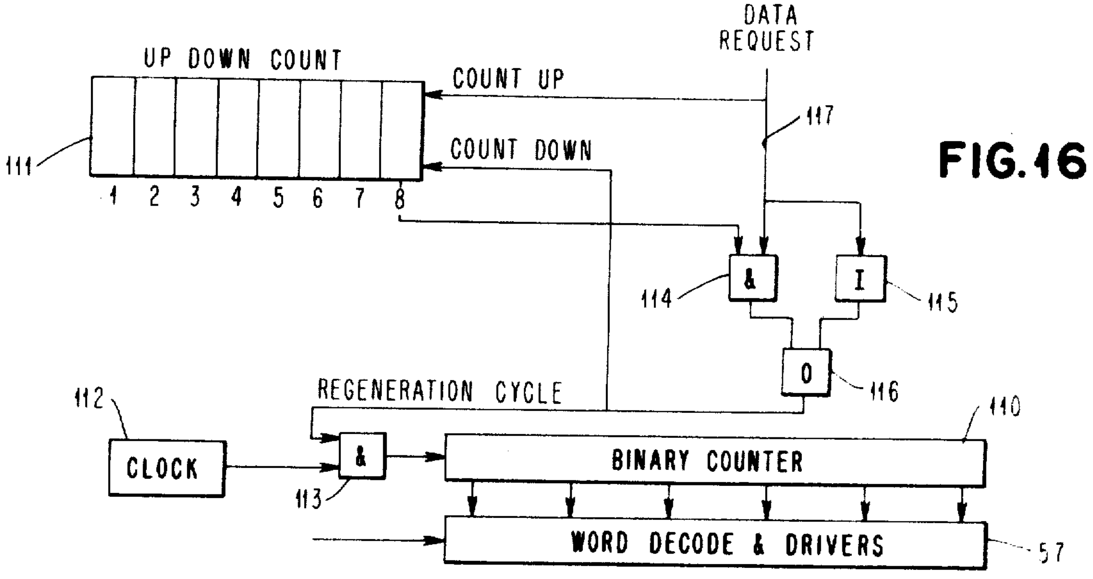
FIG. 16 is a logical representation of controls necessary, in one form of the present invention, wherein storage cells of the backing store require regeneration of the data contained therein.

The preferred embodiment of the present invention utilizes AC stable binary data storage cells which require periodic regeneration in order to retain the data stored. The organization of an integral hierarchical storage device utilizing an AC stable storage cell is shown in FIGS. 15 and 16. Reference should also be made to FIG. 7. Each of the 16 bit lines eminating from the first matrix of binary data storage cells 55 requires a sense amplifier, temporary store for the data, and a driver to rewrite the information into the storage cell accessed by one of the 64 word drivers. The regeneration circuitry, referred to as a transient register, is shown at 91 of FIG. 15. Various portions of FIG. 15 which are common to structure already discussed in connection with FIG. 7 have been given similar designations. These include the second matrix of high speed binary data storage cells 56, second selection means 58, AND circuit 71 for writing data into the storage system, and AND circuit 73 for reading data out of the storage system.

With reference to FIGS. 7 and 15, it will be recalled that the first matrix of binary data storage cells is arranged as a 64 by 16 array on each of the integral hierarchical storage devices, every bit of which represents a page of data. There are 8,192 data bits to a page located 1 to a storage device on the 8,192 storage devices of the storage system. On each of the integral hierarchical storage devices there is also the 16 bit transient register 91 and a 16 bit second matrix 56 of high speed data storage cells. 16 pages of current interest are stored in the high speed portion of the memory system. The transient register 91 is used most of the time to regenerate pages stored in the first matrix and is accomplished 16 pages at a time. The transient register 91 is also available to transfer selected pages from the first matrix to the second matrix.

FIG. 15 shows the logic which interconnects the first matrix 55 with the second matrix 56 and includes the previously mentioned transient register 91. The second selection means 58 includes a decoder 96 which decodes address bits *b1–b3* into one out of eight selection lines to both the HI and LO sections of the buffer 56 through AND circuits 97 and 98 respectively, in response to a HI enabling input at 99 or a LO enabling input at 100 from the control modules of the storage system. The 16 positions of the transient register 91 can be individually enabled by the output of a decoder 101 which responds to address bits *b0–b3*. As mentioned previously, decoder 101 will be effective to enable the transfer of a single binary bit between either the HI or LO portion of a position in the buffer 56 and either one of two positions in the transient register 91. That is, positions 0 or 1 of register 91 which represent page 0 of the segmentation will be transferred to position 0 of the buffer 56. Likewise, positions 2 or 3 of register 91 will communicate with position 1 of the buffer 56.

The actual transfer of data between the register 91 and the buffer 56 is accomplished with the remainder of the logic shown in FIG. 15 in response to data placed on a right or left bidirectional bus 102. The entry of data into either the register 91 or the buffer 56 is accomplished by a right or left driver 103. The sensing of data within a particular position of the register 91 or the buffer 56 is accomplished by a right or left sense amplifier 104.

When a page of data is required to be transferred from the first matrix to the high speed buffer matrix 56, it is transferred in a three step process. First, a block of 16 pages containing the desired page is read into the transient register 91. From there the desired page, as determined by decoder 101, is transferred by sense amplifiers 104 through an OR circuit 105 to a right or left latch 106, as determined by energization of Strobe Right or Strobe Left from the control module. From the selected latch 106, it is transferred to an OR circuit 107 through a Right or Left AND circuit 108 and drivers 103 into either of two assignable positions in the high speed buffer 56 as determined by the second selection means 58. Because all of the integral hierarchical storage devices receive the same commands an entire 1K byte page transfer is accomplished. Individual binary bits in both the high speed buffer 56 and the transient buffer 91 are directly addressable by means of decoders 96 and 101 which respond to the data processing system address bits b0–b3. Direct addressing in this manner allows two desirable features. Input/output operations can be operated directly into the transient buffer 91 over a data line 109 without effecting the operating pages in the high speed buffer 56. Further, since transient buffer 91 can contain 16 pages, suitable control circuitry could be provided to permit the transfer of many adjacent pages from the transient buffer 91 to the high speed buffer 56 in a little more time than it takes to transfer one page.

Several backing store and buffer store partitioning schemes are mentioned in the above cited Conti article and have been discussed in connection with FIGS. 12 – 14. They range from full associativity (any page with a backing store can go any place in the buffer) to the rigid mapping of one page per class (a page from the backing store may go only one place in the buffer). If the storage hierarchy is arranged to be fully associative, all address bits of requested data would have to be compared with identifying address bits associated with each page in the high speed buffer. Recent analysis using large pages as accomplished in the present invention, has shown that two pages per class produces a substantial performance improvement over one page per class and provides the basis for splitting the high speed buffer 56 into a HI or LO section which logically divides the backing store 55 into the configuration shown in FIG. 14. Two pages per class is more efficient than higher levels of associativity from a control standpoint. It facilitates a simultaneous search of a directory such as 87 in FIG. 13 and the addressing of the data within the high speed buffer 56. If the data being requested is in the high speed buffer 56, it can only be in either of two places and it is possible to provide a decoder 96 which economically searches both places. Because there are relatively few pages in the directory 87, the identification of the book from which they came can be accomplished before the contents of the high speed buffer 56 are available. Search of the data identifying directory occurs simultaneously with decoding for access to a particular position of the high speed buffer 56.

The directory 87 of FIG. 13 may be fabricated from storage devices identical to those used for the memory system as a whole. The data ID storage module is only required to receive data processing system address bits *b0 – b3* and W0 – W5 and requires no chip selection decoding. The page address bits *b0 – b2* are utilized to access the directory to read out the data identifying bits b3 and W0 – W5 for the HI or LO portion of the high speed buffer 56 associated with the particular page being addressed. The data ID module will utilize the accessed book address bits for comparison with the book address bits of the data processing system address information provided to the storage system.

Upon the initiation of a storage system access, the control simultaneously addresses through decoder 96 both of the assignable page locations in the high speed buffer 56 where the desired word may be located. Because the decode on the data ID module requires no hierarchical storage device decoding and selection, the book identifying bits of each of the two sections of the high speed buffer 56 are known in advance of the availability of access to the high speed buffer 56 through the AND circuits 71 or 73. If, as expected, either the HI or LO portion of the high speed buffer 56 associated with the particular page number does contain the data from the requested book, the data ID module will provide enabling signals 99 or 100 at AND circuits 97 or 98.

As mentioned previously, the decoder 96 and a comparable decoder associated with the data ID module are only required to decode three address bits and perform an address compare to produce the signals 99 or 100. At the same time, storage device selection on each of the storage modules 41 must be accomplished through decoder 83 and 84 of FIG. 10. This decoding must be effected on seven address bits such that by the time the device select signal is produced at AND circuit 71 or 73, the data will be available for access to or from the high speed buffer 56.

If the data ID portion of the memory system finds that the requested data is not contained in the high speed buffer 56, either the HI 99 or LO 100 signal will not be produced, and no access is granted to storage cells within the high speed buffer 56. In this case, the access to data in the backing store 55 proceeds to the point where each of the integral hierarchical storage devices will have the data from the desired page in the transient buffer 91. The desired page from the transient buffer 91 must be moved into either the HI or LO section of the high speed buffer 56 associated with the requested page. This transfer is accomplished on all of the hierarchical storage devices when the book identifying bits of the requested page have been stored in the appropriate high or low portion of the directory to thereby create the HI 99 or LO 100 signal at AND circuits 97 or 98.

Which of the HI or LO sections of the high speed buffer 56 associated with the accessed page is to receive the new page can easily be implemented in the data ID and control module. In addition to the fourteen bits required to identify the two books associated with the particular page number, additional bits can be provided to implement any of a number of simple replacement algorithms. As few as one or two binary bits can be provided in the accessed information in the directory to provide an indication of which of the two pages were last transferred from the backing store 55 to the buffer store 56 and should thus be retained. Another algorithm would provide an indication in the additional bit locations indicating which of the two pages was the last used. Another indication could be given of which page was the most recently modified.

Controls external to the memory system will enable AND circuit 71 when data is to be transferred from the data processing system to the storage system. A number of previously known design choices can be made as to how to control the storage of data into the storage system. One technique is referred to as "store-through" or "store wherever." In this technique, the data is always stored into the addressed backing store location and if the page is located in the high speed buffer 56, that data also is stored into to keep the data in both the backing store and buffer store identical.

Another technique, which provides the basis for the logic shown in FIG. 15, is known as "store in buffer." With this technique, all accesses to data whether for storing new information into a location or for reading data from a location in the storage system, is by means of access to a particular location in the high speed buffer section 56. When it is determined that the page to be read from or to be stored into is not located in the high speed buffer 56, a "page swap" must take place. As mentioned previously, any number of replacement algorithms can be implemented to determine whether the page contained in the high or low section of the buffer position to be modified should be transferred back to the backing store location. The fetch before store algorithm implemented for FIG. 15 is a scheme which allows the fetching of data to be made to the backing store before the data in the high speed buffer is transferred to its assigned location in the backing store.

By providing right and left sections of the interconnection between the register 91 and high speed buffer 56, a temporary location for the page to be replaced is provided so that the new page can be obtained from the backing store and transferred directly into the buffer. With this technique, during the time that the backing store access is being made, the data in the high speed buffer 56 to be replaced is selected by decoder 96 and inserted in either the right or left latch 106. When the access to backing store has been completed and the data inserted in register 91, register 91 can be selected by decoder 101 for the transfer through the opposite sense amplifier 104, OR circuit 105, and the opposite latch 106, for subsequent insertion through AND circuit 108, OR circuit 107, driver 103, and the selected location in the high speed buffer 56. At this point, the data will be located in its proper position of high speed buffer 56 for device selection and the gating of data out through AND circuit 73. At this time, the backing store portion can be recycled for the purpose of transferring the previously saved data in latch 106 into the proper position of the transient register 91 for subsequent insertion in the proper location of the backing store portion. By this technique, it is not necessary to delay the using system while the storage system is transferring the replaced page from the buffer store 56 to the backing store 55.

As indicated earlier, the preferred storage cell in the backing store portion 55 of each integral hierarchical storage device is comprised of circuitry which requires regeneration periodically. FIG. 16 shows one form of logic in the data control module for sharing the use of access to the backing store for regeneration and transfer of data to the high speed buffer portion in the storage system. Regeneration cycles are controlled by a six position binary counter 110 and a ring counter 111 having eight positions which can count up or down. When a particular word in the backing store portion is to be regenerated, a clock 112, AND circuit 113, and the permutations of the binary counter 110 will be effective to transfer the data from all 16 cells of the accessed word to the transient buffer 91 for subsequent regeneration of the data. Further, each regeneration cycle will step the binary counter 110 to the next succeeding word address for regeneration. By means of the AND circuit 114, inverter 115, and OR circuit 116, accesses will be made to the backing store portion of each storage device on succeeding clock cycles as long as the data processing system is not making a request on line 117 for the transfer of data from the backing store to the high speed buffer. By controlling the up/down counter 111 to ount up for each data request and count down for each regeneration cycle, use of the backing store for page transfers and regeneration can be effectively implemented. In the absence of a requirement for a page transfer by means of a signal on line 117, a long history of regeneration cycles will have occured such that counter 111 will have counted down to position 1. Should a large number of data requests be received, requiring transfer of data from the backing store to the buffer store, the counter 111 will be stepped up for each request until 7 sequential data request cycles have been executed. When the counter 111 has stepped to position 8, AND circuit 114 will be enabled such that a data request signal on line 117 will force a regeneration cycle to thereby cause counter 111 to count down to position 7. With the counter at position 7, another data request can be honored. At this point, regeneration cycles and page transfer cycles will alternate until page transfer cycles are no longer required at which point successive regeneration cycles will be permitted to count the counter 111 back down to position 1. Under normal use, this regeneration scheme allows page transfers to occur at least every other cycle of the backing store, or under certain circumstances to have up to seven successive cycles. Further, the specification of eight positions in counter 111 provides, in a preferred embodiment of the invention, assurances that regeneration of all data in the backing store portion occurs at proper intervals.

FIGS. 17 – 22 provide a more detailed discussion of another form of integral hierarchical storage devices and storage module constructed in accordance with the general discussion of FIG. 9. The first matrix or backing store portion 55 of each integral hierarchical storage device is comprised of a number of 64 position shift registers 120 and the second matrix or high speed buffer portion 56 is comprised of a four position shift register 121. Shifting of register 120 is accomplished by a clock CB and shifting of data within register 121 is accomplished by clock CA. Data to be transferred out of the shift registers is through an AND circuit 122. Data to be written into the shift registers is effective at an AND circuit 123. An AND circuit 124 is conditioned by the output position 63 of register 120 and an AND circuit 125 is conditioned by the output position 3 of shift register 121. OR circuit 126 responds to AND circuits 123, 124 or 125 to be effective under suitable control signals from a control module in the storage system to insert data into shift registers 120, 121, or to provide output data through AND circuit 122 from either shift register 120 or 121. AND circuit 127 is enabled by a system write signal 128 to enter data into the shift register when enabled by a select signal 129. In the absence of a signal to write data into the shift registers, AND circuits 124 and 125 are enabled dependent upon a true control signal 130 or a false control signal 131. The functions performed by the logic are shown in the table associated with FIG. 17 and include such things as shifting register 120 or 121, inserting data from position 63 of register 120 into position 0 of register 121, shifting data from position 3 of register 121 to position 0 of register 120, or writing data into position 0 of either register 120 or 121.

Figure 18:
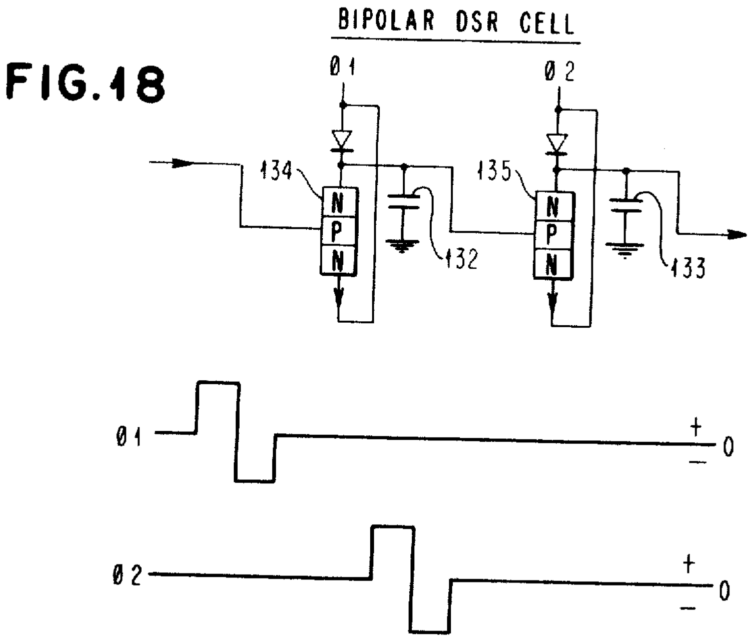
FIG. 18 is a circuit representation of a storage cell for use in a shift register of FIG. 17.

FIG. 18 is a circuit diagram of 1 position of either register 120 or 121 and is referred to in literature as a bipolar dynamic shift register cell. Each of the clocks CA or CB has two phases as depicted in the timing diagram in FIG. 18. Data is stored in a particular cell and shifted to an adjacent cell by the charging and discharging of capacitors 132 and 133 by means of turning on and off transistors 134 and 135 in accordance with the two phase signals.

Figure 17:
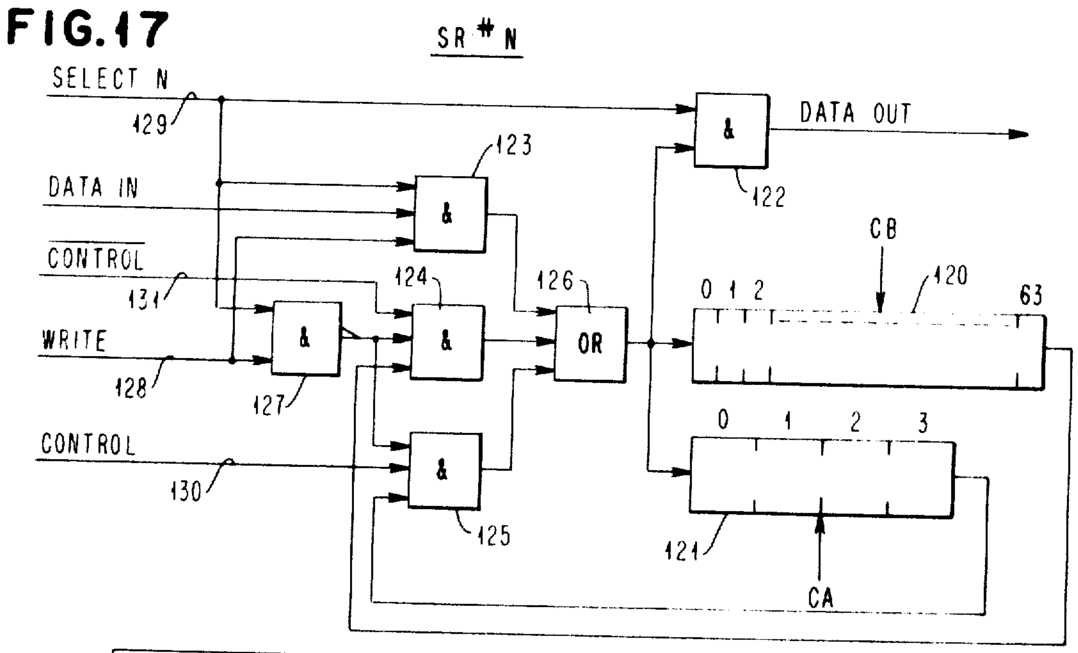
FIG. 17 is a logical representation of one form of the present invention which incorporates, on an integral hierarchical storage device, a backing store comprised of a large shift register and a buffer store comprised of a small shift register.
Figures 19, 20, 21:
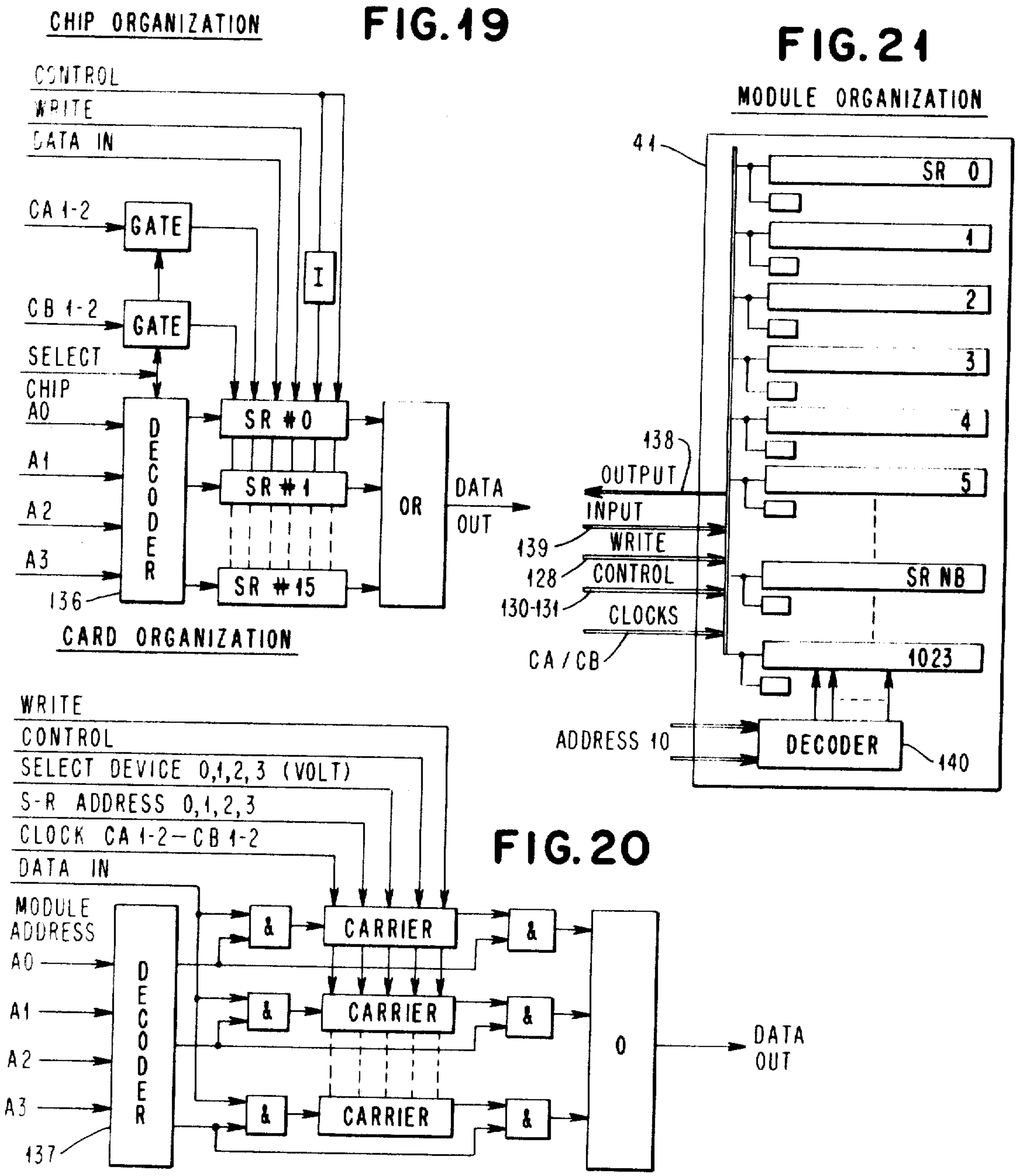
FIGS. 19 – 22 are schematic representations of the implementation of the shift register of FIG. 17 into a storage device organization, storage module configuration, storage card configuration, and ultimately a storage system respectively.

FIG. 19 shows the configuration of, and control signals for, an integral hierarchical storage device constructed to include 16 shift register combinations such as shown in FIG. 17. In accordance with previous discussions, there is also shown a bit decoder 136 comparable to bit decoders in previous discussions and would be referred to as the second selection means. First selection means would include controls shown in FIG. 19 which control the shifting of data in the shift registers. Once again, the integral hierarchical storage device is further defined as having a single terminal for data input and a single terminal for data output.

FIG. 20 shows a further organization of integral hierarchical storage devices mounted on 16 carriers which are selected by further data system address bits in a decoder 137. Each carrier of FIG. 20 will have mounted thereon, four integral hierarchical storage devices.

A storage module for use in a storage system which provides a single input/output terminal for one binary bit of a data processing word is shown in FIG. 21. The mounting of the carriers, each carrier being comprised of four integral hierarchical storage devices, and each integral hierarchical storage device being comprised of 16 shift register combinations in accordance with FIG. 18, provide a storage module organization which is comprised of 1,024 shift register combinations. Selection of only one binary bit for an output terminal 138 or an input terminal 139 requires a decoder 140 responsive to ten data processing system address bits. Terminals 138 and 139 are individual to each storage module 41. The write signal 128, control signals 130/131, and clock signal CA and CB are common to all storage modules as are the ten address bits.

Figure 22:
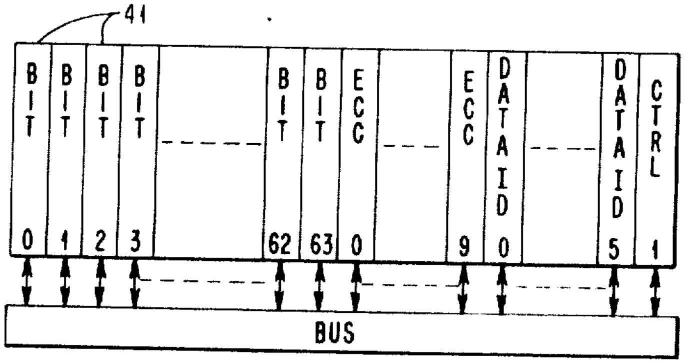

FIG. 22 shows the combining of 64 storage modules 41 into a memory system for providing eight bytes of data to a data processing system. Additional modules are provided for error checking and correction (ECC), control, and data identification. In this embodiment of the invention, the data ID modules must be constructed essentially the same as the modules that contain data and require the ability to identify the address of the data located in position 63 of register 120 and position 3 of register 121. The philosophy of fast access to data from the integral hierarchical storage device is based on the fact that the most recently accessed and used data will be found and identified in the four position shift register 121. The steps of obtaining access include utilizing the address bits of the requested data for comparison with the address identifying data in the data ID modules to determine whether or not the data is located in position 63 of register 120 or position 3 of register 121. If the requested data is in either of these positions, it can be immediately gated out of AND circuit 122 of FIG. 17. If the requested data is not in either of these positions, it is assumed that it must be part of a page recently used and would therefore be located in the four position register 121. Therefore, the control module will be energized to shift the four position register 121 and examine the contents of position 3 for a comparison with the address data. As soon as the data has been shifted to position 3 of register 121, it is gated through the AND circuit 122 of the selected shift register pair.

If the requested data is not found in the four position register 121, the data ID modules and the control modules will be effective to shift the contents of the 64 position register 120 until the address of the requested data matches the address of the data in position 63 of register 120. At this time, the control module will gate the data from position 63 into position 0 of register 121 and energize AND circuit 122 for providing the data to the system.

The control module will also include mechanism for implementing a replacement agorithm such that the data to be removed from the four position register 121 will have been moved into position 0 of register 121 to be modified by the data being transferred from position 63 of register 120.

In accordance with the designations of books and pages, the effect of the organization shown in FIGS. 21 and 22 is to place four pages, each comprised of 1,024 bytes into all of the four position shift registers 121 on all of the storage modules. This is accomplished by the fact that all shifting and transfer of data is done in common with all shift register pairs and the gating of a particular bit from each module is accomplished by means of the decoder 140 selecting only one of the 1,024 shift register pairs for transfer of data to or from the data processing system.

There has thus been shown, in accordance with the preferred embodiment of the present invention, an integral hierarchical storage device having the unique features of large storage capacity and quick access to most recently used data. The construction of the storage device is such that any number of types or sizes of logical storage segmentations are possible.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An integral hierarchical storage device comprising:

a circuit chip, a first array of a plurality of binary storage cells on said chip for the storage of binary data;

a second array of a plurality of binary storage cells on said chip for the storage of binary data;

means interconnecting said first and second arrays for the transfer of binary data therebetween;

first selection signalling means connected to said first array, the combined operation of said first array of storage and said first selection means operative in a first predetermined duration to provide access to a plurality of binary storage cells in said first array for the transfer of data by said interconnecting means;

second selection signalling means connected to said second array, the combined operation of said second array of storage and said second selection means operative in a second predetermined duration less than said first predetermined duration to provide access to a particular one of said binary storage cells in said second array for the transfer of data by said interconnecting means; and circuit chip input/output means, connected to all of said storage cells of said second array and operative in response to said second selection means, for transferring data to or from a particular one of said storage cells of said second array of storage.

2. A storage module comprising:

an array of hierarchical storage devices, each comprised of slow access speed binary storage cells and high access speed binary storage cells, said high access speed storage cells manifesting the binary data contained in the most recently used slow access speed storage cells;

cell selection means connected to all of said storage devices, including means for identifying and providing access to a particular one of said slow access speed binary storage cells of all said storage devices, and including means for providing access to binary data of said slow access speed storage cells in a particular one of said high access speed storage cells of all of said storage devices;

data transfer means associated with each of said storage devices including terminal means and gating means for interconnecting said terminal and said particular one of said high access speed storage devices;

a module terminal connected to all of said storage device terminal means; and device selection means connected to all of said data transfer gating means for selecting a particular one of said storage devices, whereby said module terminal is interconnected with said particular one of said high access speed storage cells of said particular one of said storage devices.

* * * * *